Figure 1:
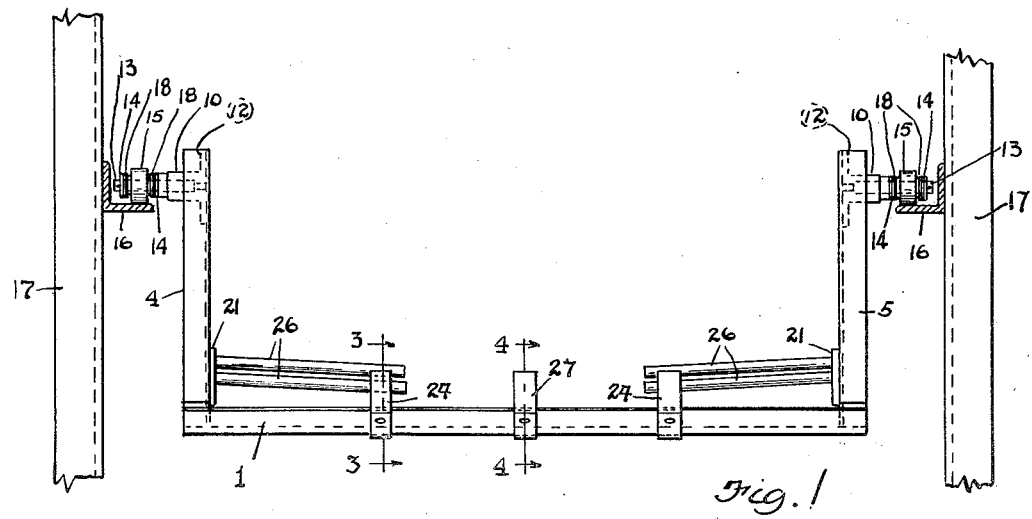

Dec. 9, 1930.                    K. F. SNOW                    1,784,615
                           BARREL CONVEYING TRAY
                             Filed Feb. 11, 1930

INVENTOR.
Karl F. Snow
BY
Fay, Oberlin & Fay
ATTORNEYS.

Patented Dec. 9, 1930

1,784,615

UNITED STATES PATENT OFFICE

KARL F. SNOW, OF BRECKSVILLE, OHIO, ASSIGNOR TO THE C. O. BARTLETT & SNOW COMPANY, OF CLEVELAND, OHIO, A CORPORATION OF OHIO

BARREL-CONVEYING TRAY

Application filed February 11, 1930. Serial No. 427,625.

This invention, relating as indicated to a barrel conveying tray has specific reference to a tray which is adaptable to be used in connection with an endless chain or like conveyor means by which the barrels are transported from one point to another.

The tray comprising my invention is particularly applicable to be used in connection with a conveyor system whereby freshly painted barrels are conveyed through a drying oven. Considerable difficulty has been experienced in conveying freshly painted barrels through a drying oven so that the wet surface of the barrel is not marred as the barrel is being moved. It is an object of my invention to provide a barrel conveying tray which shall support the freshly coated barrels on the chime rings thereof so that the outer surface of the barrel is not marred by coming in contact with the foreign objects during the course of its passage through the drying oven.

A conveying tray which shall be capable of continuous use in a plant of the character described should be adapted to support barrels of varying lengths and diameters without necessitating an adjustment of the various parts thereof. It is a further object of my invention to provide a barrel conveying tray which shall be capable of properly supporting barrels of varying diameters and lengths in the manner hereinbefore described.

When endless chains are employed to act as conveyors, by means of which the barrels are moved through the drying oven, a tray, on which the barrels are supported, in order not to interfere with the operation of the conveyor system, should be provided with means whereby such tray can be supported from the endless conveyor chain as it passes over the driving sprockets therefor.

It is a further object of my invention to provide a barrel conveying tray which is particularly applicable to be used in connection with a conveyor chain and which in no way interferes with the operation of such chain as it passes over the guiding or driving wheels or sprockets as the chain passes through the drying or like oven.

Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 2:
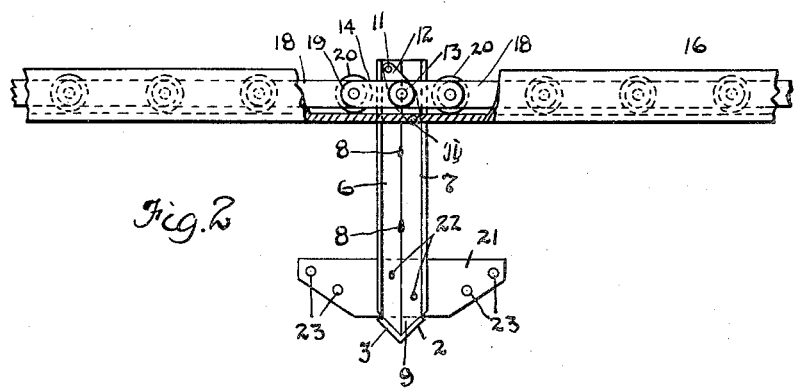
Figure 3:
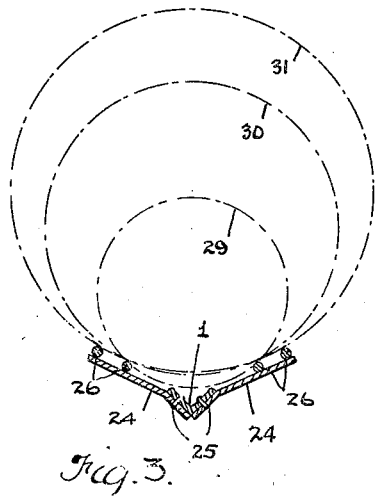
Figure 4:
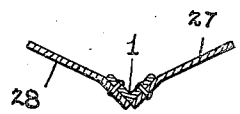

Fig. 1 is a fragmentary elevational view of the barrel conveying tray comprising my invention; Fig. 2 is a fragmentary broken part section part side elevation of the tray and the conveying chain; Fig. 3 is a transverse sectional view of the tray illustrated in Fig. 1 taken on the plane substantially indicated by the lines 3—3; and Fig. 4 is a transverse sectional view of the tray illustrated in Fig. 1 taken on the plane substantially indicated by the lines 4—4.

Referring more specifically to the drawings and more especially to Fig. 1, the tray comprising my invention consists of a bottom member 1, which is here shown in the form of an angular member having legs 2 and 3. Terminally engaged by the bottom member 1 are vertically disposed side members 4 and 5, which are preferably formed of oppositely disposed angular members 6 and 7 which have one pair of legs in juxtaposition which may be suitably united by welding, as shown at 8. The other pair of legs of the angles 6 and 7 are directed outwardly so as not to interfere with the barrels lying on the tray. The angles 6 and 7 are beveled as at 9 so as to engage the legs 2 and 3 of the bottom member 1 whereby a rigid connection between the bottom and side members may be obtained by welding or other suitable forms of construction.

The side members 4 and 5 have members 10 laterally extending therefrom and secured thereto by means of rivets or bolts 11 which pass through the laterally extending flange members 12 and engage the legs 6 and 7 of the side members 4 and 5. The members 10 rigidly secure stub shafts 13, which pass through apertures formed therefor in the links 14 of the common form of conveyor chain. Revolubly mounted on the shafts 13 are rollers 15 which are supported on a trackway 16 extending laterally from the wall 17 of a drying oven or like structure.

The conveyor chain on which the trays are mounted consists of links 14 and 18, which are suitably interconnected by pins 19 which carry rollers 20 positioned intermediately of the links 18. The described means whereby the trays are supported on the conveyor chain permits such chain to pass over the driving or guiding sprockets without in any way interfering with the operation of the conveyor.

The side frame members 4 and 5 have rigidly secured thereto plates 21, preferably by means of bolts or rivets 22, and the plates 21 have a plurality of spaced apertures 23 formed therein for the purpose hereinafter more fully described. As most clearly shown in Fig. 3, the bottom member 1 has rigidly secured thereto laterally extending bent plates 24 by means of rivets 25. Positioned on the members 24 in spaced relationship, and preferably welded thereto, are a plurality of rods 26 which, at their opposite ends, are engaged by the apertures 23 in the plate 21. The bars 26 are longitudinally and laterally spaced and inclined, as shown in Fig. 1, so that barrels of varying lengths and diameters may be supported on the tray with only the chime rings of such barrels in contact with any portion of the tray.

Positioned intermediately of the longitudinally spaced bars 26, and rigidly connected to the bottom plate 1, are members 27 and 28 which extend laterally from the bottom member 1 much in the same manner as the members 24. These projecting elements 27 and 28 prevent barrels of relatively short lengths from rolling off the tray should one end of such barrels fall from the inner end of the inclined supporting rods 26.

It will be seen from the above description that barrels of varying diameters, diagrammatically represented at 29, 30 and 31 in Fig. 3, may be supported on the tray with merely the chime rings thereof in contact with the supporting members. When the barrels are so supported they may be conveyed through the drying oven or like chamber without in any way marring the finished surface thereof. A further description of my invention is deemed unnecessary for those acquainted with the art, suffice it to say that various changes might be made in the detail construction of the tray without in any way deviating from the fundamental principles of its design.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a barrel conveying tray, the combination of spaced supporting members, means interconnecting one terminal portion of said members, means associated with said supporting members adapted to be engaged by conveyor means, and oppositely disposed barrel supporting means adapted to engage the chime rings on such barrels.

2. In a barrel conveying tray, the combination of spaced supporting members, means interconnecting one terminal portion of said members, means associated with said supporting members adapted to be engaged by conveyor means, and oppositely disposed inclined barrel supporting means adapted to engage the chime rings on such barrels.

3. In a barrel conveying tray, the combination of spaced supporting members, means interconnecting one terminal portion of said members, means associated with said supporting members adapted to be engaged by conveyor means, and oppositely disposed longitudinally spaced barrel supporting means adapted to engage the chime rings of such barrels.

4. In a barrel conveying tray, the combination of spaced supporting members, means interconnecting one terminal portion of said members, means associated with said supporting members adapted to be engaged by conveyor means, and oppositely inclined longitudinally spaced barrel supporting means adapted to engage the chime rings of such barrels.

5. In a barrel conveying tray, the combination of spaced supporting members, means interconnecting one terminal portion of said members, means associated with said supporting members adapted to be engaged by conveyor means, and oppositely inclined longitudinally and laterally spaced barrel supporting means adapted to engage the chime rings of such barrels.

6. In a barrel conveying tray, the combination of spaced supporting members, means interconnecting one terminal portion of said members, means associated with said supporting members adapted to be engaged by conveyor means, oppositely inclined longitudinally spaced barrel supporting means adapted to engage the chime rings of such barrels, and means associated with said interconnecting means and extending laterally therefrom, said last-named means positioned intermediately of said barrel supporting means for preventing such barrel from rolling from the tray.

7. In a barrel conveying tray, the combination of interconnected side and bottom members; stub shafts having rollers mounted thereon extending laterally from said side members and adapted to engage a conveyor chain; and longitudinally and laterally spaced oppositely inclined barrel supporting means adapted to engage the chime rings of such barrel.

8. In a barrel conveying tray, the combination of interconnected side and bottom members; stub shafts having rollers mounted thereon, extending laterally from said side members and adapted to engage a conveyor chain; and a plurality of longitudinally spaced oppositely inclined barrel supporting bars mounted in said tray adapted to engage the chime rings of such barrels.

9. In a barrel conveying tray, the combination of interconnected side and bottom members; stub shafts having rollers mounted thereon, extending laterally from said side members and adapted to engage a conveyor chain; a plurality of longitudinally spaced oppositely inclined barrel supporting bars mounted in said tray adapted to engage the chime rings of such barrel; and means associated with said bottom member, extending laterally therefrom and positioned intermediately said barrel supporting bars for preventing such barrel from rolling from the tray.

Signed by me, this 25th day of January, 1930.

KARL F. SNOW.